Patented Jan. 10, 1939

2,143,491

UNITED STATES PATENT OFFICE 2,143,491

DIPHENYLACETIC ACID ESTERS

Karl Miescher, Riehen, and Karl Hoffmann, Basel, Switzerland, assignors to the firm Society of Chemical Industry in Basle, Basel, Switzerland No Drawing. Application May 21, 1937, Serial No. 144,092. In Switzerland June 8, 1936

2 Claims. (Cl. 260—313)

This invention is an improvement in or a modification of that described in Patent No. 2,079,962, granted May 11, 1937. That specification describes the manufacture of basic esters of polyarylacetic acids wherein polyarylacetic acids or derivatives thereof are converted into their N-di-substituted amino-alkanol esters.

This invention relates to the manufacture of therapeutically active compounds which in a surprising manner considerably exceed in their effect that of atropine by converting by the process of Patent No. 2,079,962, granted May 11, 1937, diphenylacetic acids or derivatives thereof into the corresponding tropine esters of diphenylacetic acids.

Thus the paralyzing effect of the diphenyl acetic acid tropine ester exceeds by at least one hundred times that of atropine in muscular spasms of the isolated rabbit intestine, is of about equal effect in neural intestine spasms and of five to ten times weaker mydriatic effect. It exceeds in this respect all hitherto known agents for paralyzing the intestine.

The new compounds find application in therapeutics.

The following examples illustrate the invention, the parts being by weight:—

Example 1

23 parts of diphenylacetyl chloride are heated with 14 parts of tropine until reaction is complete, the cooled product is shaken with ether and diluted hydrochloric acid and the acid aqueous solution is made alkaline and extracted with ether. The ethereal solution is dried and distilled, whereby the diphenylacetic acid tropine ester of the formula

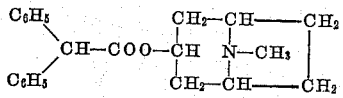

remains and may be purified by distillation in a vacuum. It is a colorless viscid oil of boiling point under 0.007 mm. pressure of 168–170° C. Its hydrochloride melts at 208–211° C. and is freely soluble in water; its methyl iodide decomposes at 252–255° C. and its methyl chloride at 241–242° C.

Instead of the diphenylacetyl chloride there may be used another halide, for instance diphenylacetyl bromide. The same compound is also obtained if equivalent quantities of diphenylacetic acid methyl ester and tropine are caused to react at a raised temperature and the product fractionally distilled in a vacuum. Also other diphenylacetic acid esters may be used as parent materials.

Furthermore, diphenylacetic acid and tropine may be caused to react in the presence of a suitable condensing agent, for example hydrochloric acid, the above base being obtained.

The same final product is obtained when diphenyl ketene is allowed to react to completion with tropine in an organic solvent.

Example 2

The operation is similar to that described in Example 1 but with pseudo-tropine in substitution for tropine; there is obtained the diphenylacetic acid pseudo-tropine ester of the formula

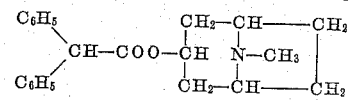

in the form of magnificent small plates of melting point 99–100° C. Its hydrochloride is freely soluble in water.

The corresponding esters of triphenylacetic acid may be obtained in a similar manner.

What we claim is:—

1. The esters of the formula

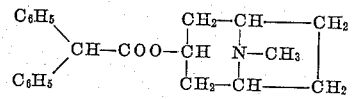

which substances are soluble in organic solvents and insoluble in water, forming with acids water-soluble salts of strong paralyzing action on the intestine.

2. The diphenyl acetic acid tropine ester of the formula

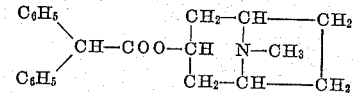

forming a water-soluble hydrochloride of melting point 208–211° C. of strong paralyzing action on the intestine.

KARL MIESCHER.
KARL HOFFMANN.